United States Patent
Luo et al.

(10) Patent No.: US 8,588,150 B2
(45) Date of Patent: Nov. 19, 2013

(54) RNTI-DEPENDENT SCRAMBLING SEQUENCE INITIALIZATION

(75) Inventors: Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

(21) Appl. No.: 12/536,440

(22) Filed: Aug. 5, 2009

(65) Prior Publication Data

US 2010/0034161 A1 Feb. 11, 2010

Related U.S. Application Data

(60) Provisional application No. 61/087,100, filed on Aug. 7, 2008.

(51) Int. Cl.
*H04W 72/00* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| | | | |
|---|---|---|---|
| 6,549,779 | B1 | 4/2003 | Muller et al. |
| 2009/0041240 | A1 | 2/2009 | Parkvall et al. |
| 2009/0238128 | A1* | 9/2009 | Park et al. ..................... 370/329 |
| 2009/0238366 | A1* | 9/2009 | Park et al. ..................... 380/270 |
| 2009/0268910 | A1 | 10/2009 | Liu et al. |
| 2009/0307555 | A1 | 12/2009 | Cai et al. |
| 2009/0323957 | A1 | 12/2009 | Luo et al. |
| 2010/0074215 | A1* | 3/2010 | Park et al. ..................... 370/329 |
| 2012/0176995 | A1* | 7/2012 | Parkvall et al. ............... 370/329 |

FOREIGN PATENT DOCUMENTS

| | | |
|---|---|---|
| RU | 2010108231 A | 9/2011 |
| WO | WO2007091924 A1 | 8/2007 |
| WO | 2008086244 | 7/2008 |
| WO | WO2008085954 A2 | 7/2008 |
| WO | WO2009020423 A1 | 2/2009 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.211 V8.3.0, May 2008. (76 pages).

(Continued)

*Primary Examiner* — Sulaiman Nooristany
(74) *Attorney, Agent, or Firm* — Ashish L. Patel

(57) ABSTRACT

Systems and methodologies are described that facilitate initializing scrambling sequence generation in a wireless communication environment. Scrambling sequence generation can be initialized (e.g., at a start of each subframe, ... ) at least in part as a function of a type of Radio Network Temporary Identifier (RNTI). Further, the type of RNTI utilized for initialization of scrambling sequence generation can correspond to a transmission type (e.g., whether the transmission is related to system information, paging, random access response, scheduled transmission or contention resolution message of a random access procedure, SPS traffic, regular unicast traffic, ... ). Moreover, the scrambling sequence can be leveraged to scramble data for transmission over a data channel (e.g., Physical Downlink Shared Channel (PDSCH), Physical Uplink Shared Channel (PUSCH), ... ). Further, a receiving wireless communication apparatus can utilize a descrambling sequence similarly yielded based upon the type of RNTI corresponding to the transmission type.

49 Claims, 10 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.213 V8.3.0 (May 2008). (43 pages).

International Search Report and Written Opinion—PCT/US2009/053150, International Search Authority—European Patent Office—Feb. 8, 2010.

LG Electronics, Scrambling of Message 3, 3GPP TSG-RAN WG2#62, R2-082508, Kansas City, USA, May 5-9, 2008.

Nokia et al., Way Forward on Scrambling Sequence Initialisation, R1-081128, 3GPP TSG-RAN WG1#52, Sorrento, Italy, Feb. 15, 2008.

Nokia Corporation, Nokia Siemens Networks: "Allocation of RNTI values", 3GPP TSG-RAN WG2 Meeting #61, R2-080987, Feb. 11-15, 2008.

\* cited by examiner

RNTI-DEPENDENT SCRAMBLING SEQUENCE INITIALIZATION

CROSS-REFERENCE TO RELATED APPLICATIONS

This application claims the benefit of U.S. Provisional Patent Application Ser. No. 61/087,100 entitled "RNTI-DEPENDENT SCRAMBLING SEQUENCE INITIALIZATION" which was filed Aug. 7, 2008. The entirety of the aforementioned application is herein incorporated by reference.

BACKGROUND

I. Field

The following description relates generally to wireless communications, and more particularly to initializing a scrambling sequence utilized to scramble information for transmission over a channel as a function of a Radio Network Temporary Identifier (RNTI) pertaining to a type of transmission in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Wireless communication systems often leverage use of scrambling sequences to scramble information for transmission over a channel (e.g., uplink channel, downlink channel, . . . ). Information to be transmitted can be scrambled for the purpose of interference rejection. For instance, without scrambling, a receiving wireless communication apparatus (e.g., access terminal, base station, . . . ) can be equally matched to an interfering signal as compared to a target signal; hence, the receiving wireless communication apparatus can be unable to adequately suppress the interference. Thus, scrambling sequences can be used to provide a level of randomization between the target signal and the interfering signal after descrambling by the receiving wireless communication apparatus. The randomization can be helpful to improve reception and decoding of the target signal at the receiving wireless communication apparatus (e.g., access terminal, base station, . . . ). Conventional scrambling techniques, however, typically fail to sufficiently account for different types of transmissions that can be sent by a transmitting wireless communication apparatus (e.g., base station, access terminal, . . . ) over a channel.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating initializing of scrambling sequence generation in a wireless communication environment. Scrambling sequence generation can be initialized (e.g., at a start of each subframe, . . . ) at least in part as a function of a type of Radio Network Temporary Identifier (RNTI). Further, the type of RNTI utilized for initialization of scrambling sequence generation can correspond to a transmission type (e.g., whether the transmission is related to system information, paging, random access response, scheduled transmission or contention resolution message of a random access procedure, SPS traffic, regular unicast traffic, . . . ). Moreover, the scrambling sequence can be leveraged to scramble data for transmission over a data channel (e.g., Physical Downlink Shared Channel (PDSCH), Physical Uplink Shared Channel (PUSCH), Further, a receiving wireless communication apparatus can utilize a descrambling sequence similarly yielded based upon the type of RNTI corresponding to the transmission type.

According to related aspects, a method that facilitates scrambling data for transmission in a wireless communication environment is described herein. The method can include selecting a type of Radio Network Temporary Identifier (RNTI) as a function of a transmission type corresponding to data. Further, the method can include initializing generation of a scrambling sequence based at least in part upon an RNTI value of the selected type of RNTI. Moreover, the method can comprise scrambling the data with the scrambling sequence to yield scrambled data. Additionally, the method can include transmitting the scrambled data to at least one receiving wireless communication apparatus.

Another aspect relates to a wireless communications apparatus. The wireless communications apparatus can include a memory that retains instructions related to choosing a type of Radio Network Temporary Identifier (RNTI) as a function of a transmission type corresponding to data, initializing generation of a scrambling sequence based at least in part upon an RNTI value of the chosen type of RNTI, and scrambling the data with the scrambling sequence to yield scrambled data. Further, the wireless communications apparatus can include a processor, coupled to the memory, configured to execute the instructions retained in the memory.

Yet another aspect relates to a wireless communications apparatus that enables employing Radio Network Temporary Identifier (RNTI) dependent scrambling sequence initialization in a wireless communication environment. The wireless communications apparatus can include means for identifying a transmission type for data. Moreover, the wireless communications apparatus can include means for choosing a type of RNTI based upon the transmission type. Further, the wireless communications apparatus can include means for initializing generation of a scrambling sequence based at least in part upon an RNTI value of the chosen type of RNTI.

Still another aspect relates to a computer program product that can comprise a computer-readable medium. The computer-readable medium can include code for identifying a transmission type for data. Moreover, the computer-readable medium can include code for selecting a type of Radio Network Temporary Identifier (RNTI) based upon the transmission type. Further, the computer-readable medium can include code for initializing generation of a scrambling sequence based at least in part upon an RNTI value of the selected type of RNTI. The computer-readable medium can also include code for scrambling the data with the scrambling sequence to output scrambled data.

In accordance with another aspect, a wireless communications apparatus can include a processor, wherein the processor can be configured to identify a transmission type for data. Moreover, the processor can be configured to select a type of Radio Network Temporary Identifier (RNTI) based upon the transmission type. Still yet, the processor can be configured to recognize an RNTI value of the selected type of RNTI for one or more intended recipients of the data. Further, the processor can be configured to initialize generation of a scrambling sequence at a beginning of a subframe based at least in part upon the RNTI value of the selected type of RNTI. The processor can also be configured to scramble the data with the scrambling sequence to output scrambled data. Additionally, the processor can be configured to transmit the scrambled data to one or more receiving wireless communication apparatuses.

According to other aspects, a method that facilitates descrambling data in a wireless communication environment is described herein. The method can include receiving scrambled data from a transmitting wireless communication apparatus. Further, the method can include identifying a type of Radio Network Temporary Identifier (RNTI) as a function of a transmission type corresponding to the scrambled data. Moreover, the method can include initializing generation of a descrambling sequence based at least in part upon an RNTI value of the identified type of RNTI. The method can also include unscrambling the scrambled data with the descrambling sequence.

Another aspect relates to a wireless communications apparatus. The wireless communications apparatus can include a memory that retains instructions related to recognizing a type of Radio Network Temporary Identifier (RNTI) as a function of a transmission type corresponding to scrambled data, initializing generation of a descrambling sequence based at least in part upon an RNTI value of the recognized type of RNTI, and unscrambling the scrambled data with the descrambling sequence. Further, the wireless communications apparatus can include a processor, coupled to the memory, configured to execute the instructions retained in the memory.

Yet another aspect relates to a wireless communications apparatus that enables effectuating Radio Network Temporary Identifier (RNTI) dependent descrambling sequence initialization in a wireless communication environment. The wireless communications apparatus can include means for identifying a transmission type for received data. Moreover, the wireless communications apparatus can include means for recognizing a type of RNTI associated with the transmission type. Further, the wireless communications apparatus can comprise means for initializing generation of a descrambling sequence based at least in part upon an RNTI value of the recognized type of RNTI.

Still another aspect relates to a computer program product that can comprise a computer-readable medium. The computer-readable medium can include code for identifying a transmission type for received data; code for recognizing a type of Radio Network Temporary Identifier (RNTI) associated with the transmission type; code for initializing generation of a descrambling sequence based at least in part upon an RNTI value of the recognized type of RNTI; and code for unscrambling the received data with the descrambling sequence.

In accordance with another aspect, a wireless communications apparatus can include a processor, wherein the processor can be configured to identify a transmission type for received data. The processor can also be configured to identify a type of Radio Network Temporary Identifier (RNTI) associated with the transmission type. Further, the processor can be configured to initialize generation of a descrambling sequence based at least in part upon an RNTI value of the recognized type of RNTI. Moreover, the processor can be configured to unscramble the received data with the descrambling sequence.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
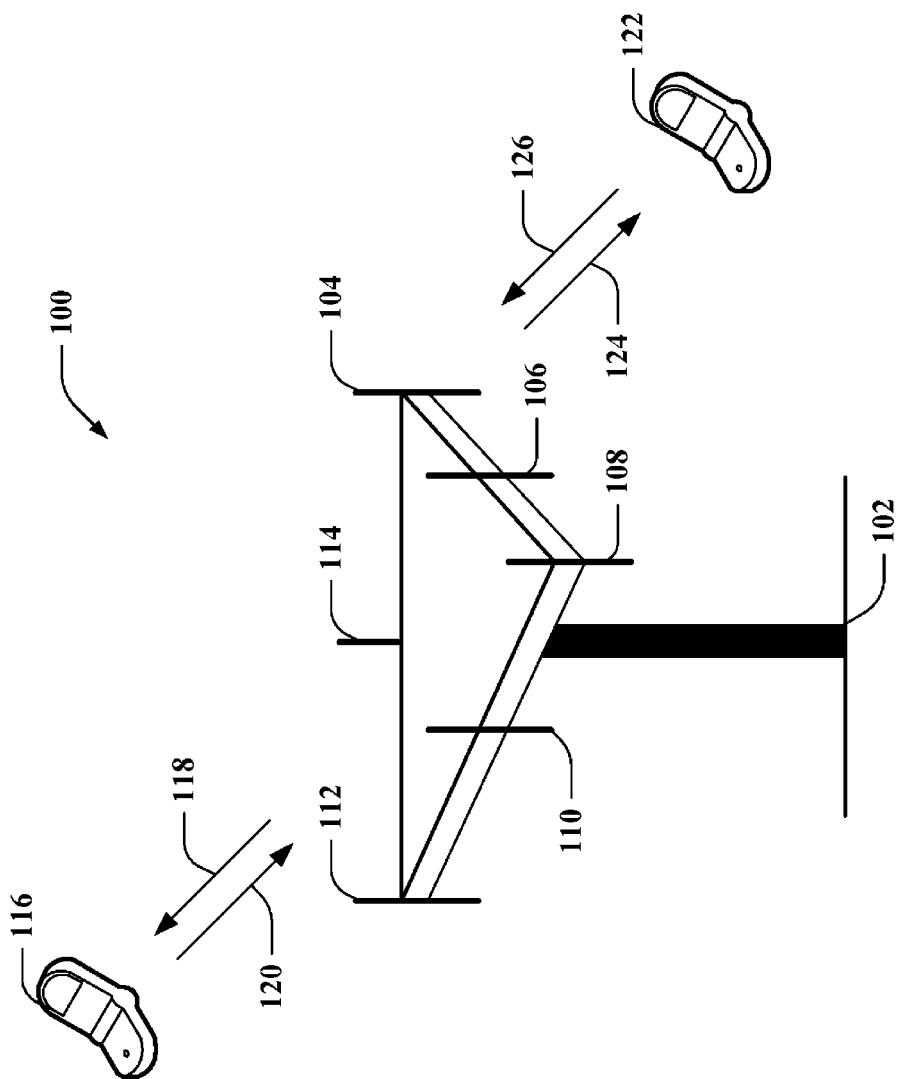
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can scramble information for transmission over a channel. For instance, information sent over a downlink channel from base station 102 to access terminals 116, 122 can be scrambled and/or information sent over an uplink channel from access terminals 116, 122 to base station 102 can be scrambled. Further, a transmitting wireless communication apparatus (e.g., base station 102, access terminal 116, access terminal 122, . . . ) can utilize a scrambling sequence to scramble information for transmission and/or a receiving wireless communication apparatus (e.g., base station 102, access terminal 116, access terminal 122, . . . ) can employ a descrambling sequence, which corresponds to the scrambling sequence used by the transmitting wireless communication apparatus, to descramble received information.

Moreover, a scrambling sequence employed by the transmitting wireless communication apparatus to scramble information (e.g., and/or a descrambling sequence used by the receiving wireless communication apparatus to descramble the information, . . . ) can be a function of a type, or nature, of the transmission. For instance, the type associated with the transmission can be based at least partially on a logical channel corresponding to the transmission (e.g., the logical channel to which the transmission maps, . . . ). More particularly, a Radio Network Temporary Identifier (RNTI) corresponding to a type of a transmission can be utilized for scrambling sequence initialization. Thus, a particular type of RNTI from a set of RNTI types can be selected based upon a transmission type. Further, an RNTI value (e.g., corresponding to intended recipient(s), . . . ) of the particular type can be used as an input to generate a scrambling sequence. Moreover, the generated scrambling sequence can be leveraged to scramble data for transmission and/or descramble received data. Hence, system 100 supports employing a type of RNTI specific to a type of transmission for initialization of a scrambling sequence, rather than using the same type of RNTI for initializing a scrambling sequence regardless of transmission type.

Figure 2:
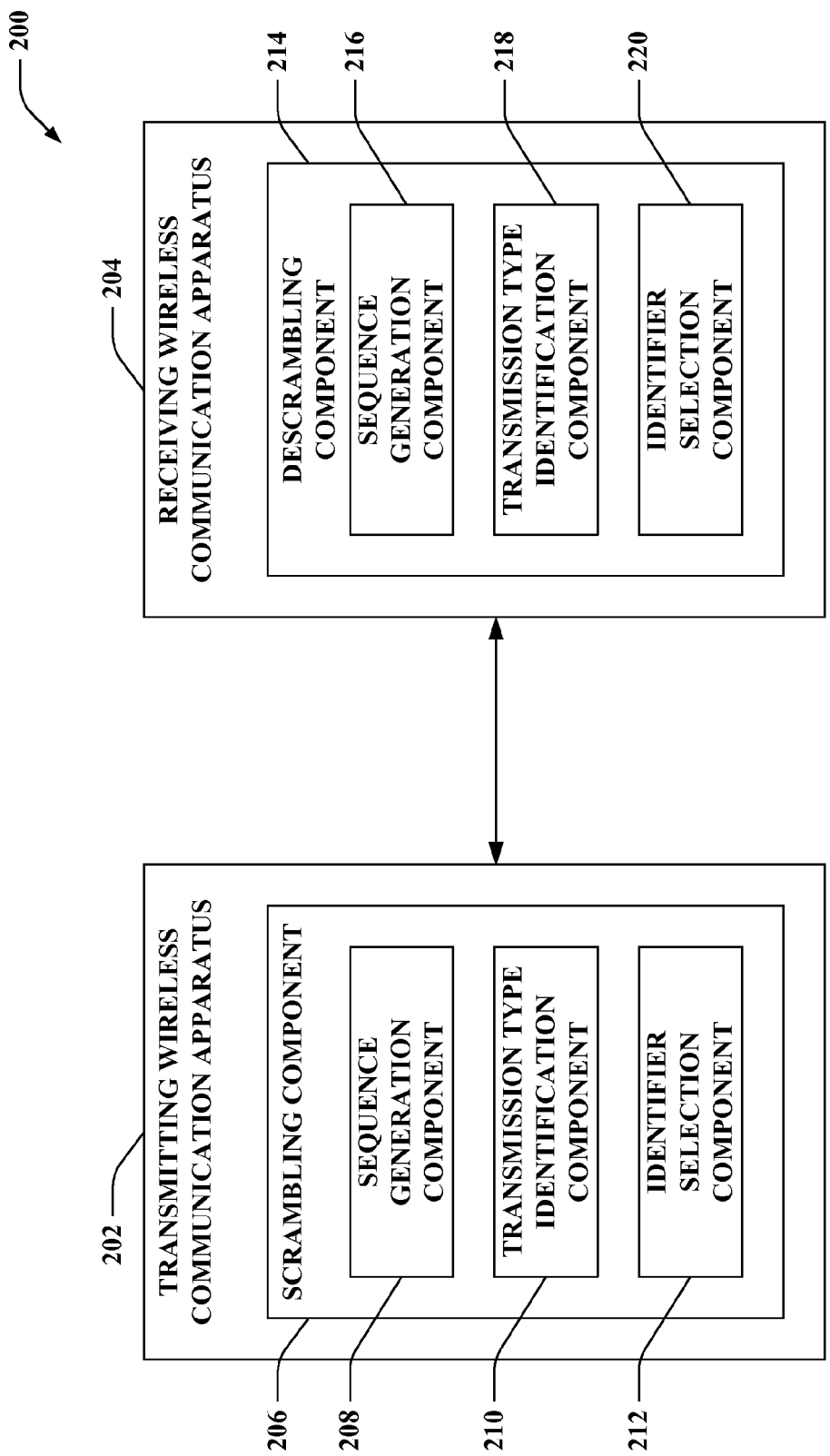
FIG. 2 is an illustration of an example system that employs RNTI-dependent scrambling in a wireless communication environment.

Now turning to FIG. 2, illustrated is a system 200 that employs RNTI-dependent scrambling in a wireless communication environment. System 200 includes a transmitting wireless communication apparatus 202 that transmits data via a channel to a receiving wireless communication apparatus 204. Although transmitting wireless communication apparatus 202 is depicted to be sending data to receiving wireless communication apparatus 204, it is to be appreciated that transmitting wireless communication apparatus 202 can be receiving data and/or receiving wireless communication apparatus 204 can be transmitting data (e.g., concurrently, at disparate times, . . . ). Hence, although not shown, it is to be appreciated that transmitting wireless communication apparatus 202 and receiving wireless communication apparatus 204 can be substantially similar. Transmitting wireless communication apparatus 202, for instance, can be a base station (e.g., base station 102 of FIG. 1, . . . ), an access terminal (e.g., access terminal 116 of FIG. 1, access terminal 122 of FIG. 1, . . . ), or the like. Moreover, receiving wireless communication apparatus 204 can be, for example, a base station (e.g., base station 102 of FIG. 1, . . . ), an access terminal (e.g., access terminal 116 of FIG. 1, access terminal 122 of FIG. 1, . . . ), etc.

According to an example, system 200 can be a Long Term Evolution (LTE) based wireless communication system; however, the claimed subject matter is not so limited. Further, it is to be appreciated that transmitting wireless communication apparatus 202 can send scrambled data over an uplink channel (e.g., Physical Uplink Shared Channel (PUSCH), . . . ), a downlink channel (e.g., Physical Downlink Shared Channel (PDSCH), . . . ), or the like as described herein. The claimed subject matter, however, is not limited to the foregoing examples.

Transmitting wireless communication apparatus 202 can further include a scrambling component 206 that scrambles data utilizing a scrambling sequence. For instance, scrambling component 206 can effectuate bit level scrambling, where an inputted block of bits can be multiplied (e.g., utilizing an exclusive- or operation, . . . ) by the scrambling sequence to yield an outputted block of scrambled bits. The scrambling sequence, for example, can be a length-31 Gold code; thus, $2^{31}$ possible sequences which are not cyclic shifts of each other can be provided. Further, Gold codes can be generated from modulo-2 addition of two maximum-length sequences (M-sequences). It is to be appreciated, however, that the claimed subject matter is not limited to the aforementioned example.

Scrambling component 206 can further include a sequence generation component 208, a transmission type identification component 210, and an identifier selection component 212. The scrambling sequence employed by scrambling component 206 can be initialized at a start of each subframe by sequence generation component 208 (e.g., sequence generation component 208 can be initialized at a beginning of each subframe, . . . ). Sequence generation component 208, for example, can yield the scrambling sequence for each subframe (e.g., to be applied to PDSCH transmissions, PUSCH transmissions, . . . ) as a function of an identity of a cell and/or a slot number (or subframe number) within a radio frame.

Moreover, for a transmission on a transport channel that maps to a physical data channel (e.g., PDSCH, PUSCH, . . . ), sequence generation component 208 can generate the scrambling sequence (e.g., initialize generation of the scrambling sequence, . . . ) based upon a type, or nature, of a transmission as recognized by transmission type identification component 210. By way of example, transmission type identification component 210 can identify a transmission type corresponding to data to be scrambled. Following this example, transmission type identification component 210 can recognize that data is associated with a system information transmission, a paging message, a message of a random access procedure (e.g., a random access response (message 2), a scheduled transmission (message 3), a contention resolution message (message 4), . . . ), a semi-persistent scheduling (SPS) transmission, or regular traffic (e.g., unicast traffic, . . . ) associated with an access terminal (e.g., access terminal-specific traffic, to be transmitted to the access terminal, to be sent from the access terminal, . . . ). Additionally or alternatively, transmission type identification component 210 can recognize the transmission type at least in part based upon a logical channel associated with the transmission (e.g., Broadcast Control Channel (BCCH) can carry system information, Paging Control Channel (PCCH) can carry paging information, Common Control Channel (CCCH) can be a point-to-multipoint channel used before a Radio Resource Control (RRC) connection is established, a random access response can be sent over a Downlink Shared Channel (DL-SCH), Dedicated Traffic Channel (DTCH) can carry unicast traffic, . . . ). According to a further illustration, transmission type identification component 210 can detect whether the transmission is a unicast, multicast, or broadcast transmission.

Further, identifier selection component 212 can select an RNTI type to be utilized by sequence generation component 208 as a function of the transmission type recognized by transmission type identification component 210. Pursuant to an example, when transmission type identification component 210 recognizes a system information transmission, a System Information RNTI (SI-RNTI) can be chosen by identifier selection component 212 for use by sequence generation component 208. By way of another illustration, a Paging RNTI (P-RNTI) can be selected by identifier selection component 212 for employment by sequence generation component 208 upon transmission type identification component 210 detecting a paging message. Further, upon transmission type identification component 210 identifying a random access response (message 2 of a random access procedure), identifier selection component 212 can elect a Random Access RNTI (RA-RNTI) for utilization by sequence generation component 208. In accordance with another example, a Temporary Cell RNTI (Temporary C-RNTI) can be selected by identifier selection component 212 for use by sequence generation component 208 when a scheduled transmission (message 3 of a random access procedure) or a contention resolution message (message 4 of a random access procedure) is detected by transmission type identification component 210. Further, when an SPS transmission is recognized by transmission type identification component 210, identifier selection component 212 can choose an SPS C-RNTI for use by sequence generation component 208. According to another example, upon transmission type identification component 210 detecting regular traffic, identifier selection component 212 can select a C-RNTI for employment by sequence generation component 208. It is to be appreciated, however, that the claimed subject matter is not limited to the foregoing as it is contemplated that any other types of transmissions are intended to fall within the scope of the hereto appended claims.

Moreover, identifier selection component 212 can choose a particular RNTI value of the selected type corresponding to an identity of intended recipient(s) (e.g., receiving wireless communication apparatus 204, disparate receiving wireless communication apparatus(es) (not shown), . . . ) for the transmission. For instance, the intended recipient can be a specific receiving wireless communication apparatus (e.g., receiving wireless communication apparatus 204, . . . ); thus, the transmission can be a unicast message. According to another example, the intended recipients can be a group of receiving wireless communication apparatuses (e.g., the group can include receiving wireless communication apparatus 204, . . . ); thus, the transmission can be a multicast or broadcast transmission.

The particular RNTI value of the selected type as yielded by identifier selection component 212 can be utilized by sequence generation component 208 to generate a scrambling sequence. More particularly, the scrambling sequence yielded by sequence generation component 208 can be initialized as a function of the particular RNTI value of the selected type. Additionally or alternatively, the scrambling sequence generated by sequence generation component 208 can be initialized based upon an identity of a cell (e.g., corresponding to transmitting wireless communication apparatus 202 when sending a downlink transmission, . . . ) and/or a slot number (or subframe number) within a radio frame associated with the transmission.

Pursuant to an example, transmitting wireless communication apparatus 202 can be a base station and receiving wireless communication apparatus 204 can be an access terminal. Further, the transmission can be a downlink transmission sent over a downlink data channel (e.g., Physical Downlink Shared Channel (PDSCH), . . . ). Following this example, transmission type identification component 210 can recognize that the downlink transmission to be sent via PDSCH includes system information, a paging message, a random access response, a contention resolution message, SPS data, or regular traffic, and based thereupon, identifier selection component 212 can select one of the following types of RNTIs corresponding to the nature of the downlink transmission: SI-RNTI, P-RNTI, RA-RNTI, Temporary C-RNTI, SPS C-RNTI, or C-RNTI. Further, an RNTI value for the selected type of RNTI corresponding to access terminal(s) (e.g., receiving wireless communication apparatus 204, disparate receiving wireless communication apparatus(es) (not shown), . . . ) to which the transmission is to be directed can be chosen by identifier selection component 212 and thereafter leveraged by sequence generation component 208 to initialize a scrambling sequence utilized to scramble the downlink transmission (e.g., via scrambling component 206, . . . ).

By way of another example, transmitting wireless communication apparatus 202 can be an access terminal and receiving wireless communication apparatus 204 can be a base station. Moreover, the transmission can be an uplink transmission transferred over an uplink data channel (e.g., Physical Uplink Shared Channel (PUSCH), . . . ). According to this example, transmission type identification component 210 can detect that the uplink transmission to be sent over PUSCH includes a scheduled transmission (message 3 of a random access procedure), SPS data, or regular traffic. As a function of the detected nature of the uplink transmission, identifier selection component 212 can chose one of the following types of RNTIs: Temporary C-RNTI, SPS C-RNTI, or C-RNTI. Moreover, an RNTI value for the chosen type of RNTI corresponding to a base station (e.g., receiving wireless communication apparatus 204, . . . ) to which the transmission is to be directed can be selected by identifier selection component 212. The RNTI value of the chosen type of RNTI can be used by sequence generation component 208 to initialize a scrambling sequence employed to scramble the uplink transmission (e.g., via scrambling component 206, . . . ).

It is to be appreciated, however, that the claimed subject matter is not limited to the aforementioned examples. Further, it is contemplated that more than one type of RNTI can be selected by identifier selection component 212 and utilized by sequence generation component 208 in connection with initializing a scrambling sequence.

Sequence generation component 208 can be initialized at a start of each subframe. More particularly, an initialization value, $c_{init}$, can be used by sequence generation component 208. By way of example, for a PDSCH transmission (e.g., transmitting wireless communication apparatus 202 is a base station, . . . ), an initialization value, $c_{init}$, can be yielded by sequence generation component 208 by evaluating $c_{init}=n_{RNTI} \cdot 2^{14}+q \cdot 2^{13}+\lfloor n_s/2 \rfloor \cdot 2^9+N_{ID}^{cell}$, where $n_{RNTI}$ is the RNTI value of the type of RNTI selected by identifier selection component 212, q is a code word number (e.g., up to two code words can be transmitted in one subframe, q is equal to zero in the case of a single code word, . . . ), $n_s$ is a slot number within a radio frame, and $N_{ID}^{cell}$ is a physical layer cell identity. Further, for a different transport channel type that maps to a different downlink physical channel (e.g., Physical Multicast Channel (PMCH), . . . ), sequence generation component 208 can obtain an initialization value, $c_{init}$, by evaluating $c_{init}=\lfloor n_s/2 \rfloor \cdot 2^9+N_{ID}^{MBSFN}$, where $n_s$ is a slot number within a radio frame and $N_{ID}^{MBSFN}$ is a Multicast/Broadcast over a Single Frequency Network (MBSFN) area identity. Pursuant to another example, for a PUSCH transmission (e.g., transmitting wireless communication apparatus 202 is an access terminal, . . . ), an initialization value, $c_{init}$, can be generated by sequence generation component 208 by analyzing $c_{init}=n_{RNTI} \cdot 2^{14}+\lfloor n_s/2 \rfloor \cdot 2^9+N_{ID}^{cell}$, where $n_{RNTI}$ is the RNTI value of the type of RNTI selected by identifier selection component 212, $n_s$ is a slot number within a radio frame, and $N_{ID}^{cell}$ is a physical layer cell identity. Thus, in accordance with the aforementioned examples, for a transport channel that maps to a physical data channel (e.g., PDSCH, PUSCH, . . . ), scrambling sequence initialization can be a function of a type of RNTI, which can correspond to a type of transmission. Hence, for a system information block type X message (SIBx) transmission over PDSCH, SI-RNTI can be utilized by sequence generation component 208 to yield the initialization value for the scrambling sequence. Moreover, for a paging message over PDSCH, P-RNTI can be employed by sequence generation component 208 to generate the initialization value for the scrambling sequence. In contrast, conventional techniques commonly employ an identifier that is specific to an access terminal (e.g., access terminal specific RNTI, . . . ) for initializing a scrambling sequence regardless of the type of transmission. Yet, a physical data channel can carry transmissions other than access terminal specific transmissions. For instance, PDSCH can carry PDSCH transmissions targeting a group of access terminals (e.g., including receiving wireless communication apparatus 204, . . . ) using Physical Downlink Control Channel (PDCCH) Device Class Identification (DCI) format IC, where DCI format IC can be used to schedule a Downlink Broadcast Channel (DBCH) carrying SIBx information, a Random Access Channel (RACH) response, and/or a paging message. Hence, it can be undesirable to leverage an access terminal specific RNTI for scrambling sequence initialization without regard for transmission type. It is to be appreciated, however, that the claimed subject matter is not limited to the aforementioned examples.

Receiving wireless communication apparatus 204 can further include a descrambling component 214 that descrambles data received from transmitting wireless communication apparatus 202 (and/or any disparate transmitting wireless communication apparatus(es) (not shown)). Descrambling component 214 can employ a descrambling sequence to descramble the received data. The descrambling sequence can correspond to the scrambling sequence utilized by transmitting wireless communication apparatus 202 to scramble the data for transmission.

Descrambling component 214 can further include a sequence generation component 216, a transmission type identification component 218, and an identifier selection component 220, each of which can be substantially similar to sequence generation component 208, transmission type identification component 210, and identifier selection component 212, respectively. Thus, sequence generation component 216 can yield the descrambling sequence for unscrambling data obtained via a data channel (e.g., PDSCH, PUSCH, . . . ) based at least in part upon an RNTI value for a particular type of RNTI recognized by identifier selection component 220. Further, the particular type of RNTI can be a function of a type, or nature, of a transmission as detected by transmission type identification component 210. Moreover, the RNTI value for the particular type of RNTI can correspond uniquely to receiving wireless communication apparatus 204, pertain to a group of receiving wireless communication apparatuses that includes receiving wireless communication apparatus 204, and so forth.

Figure 3:
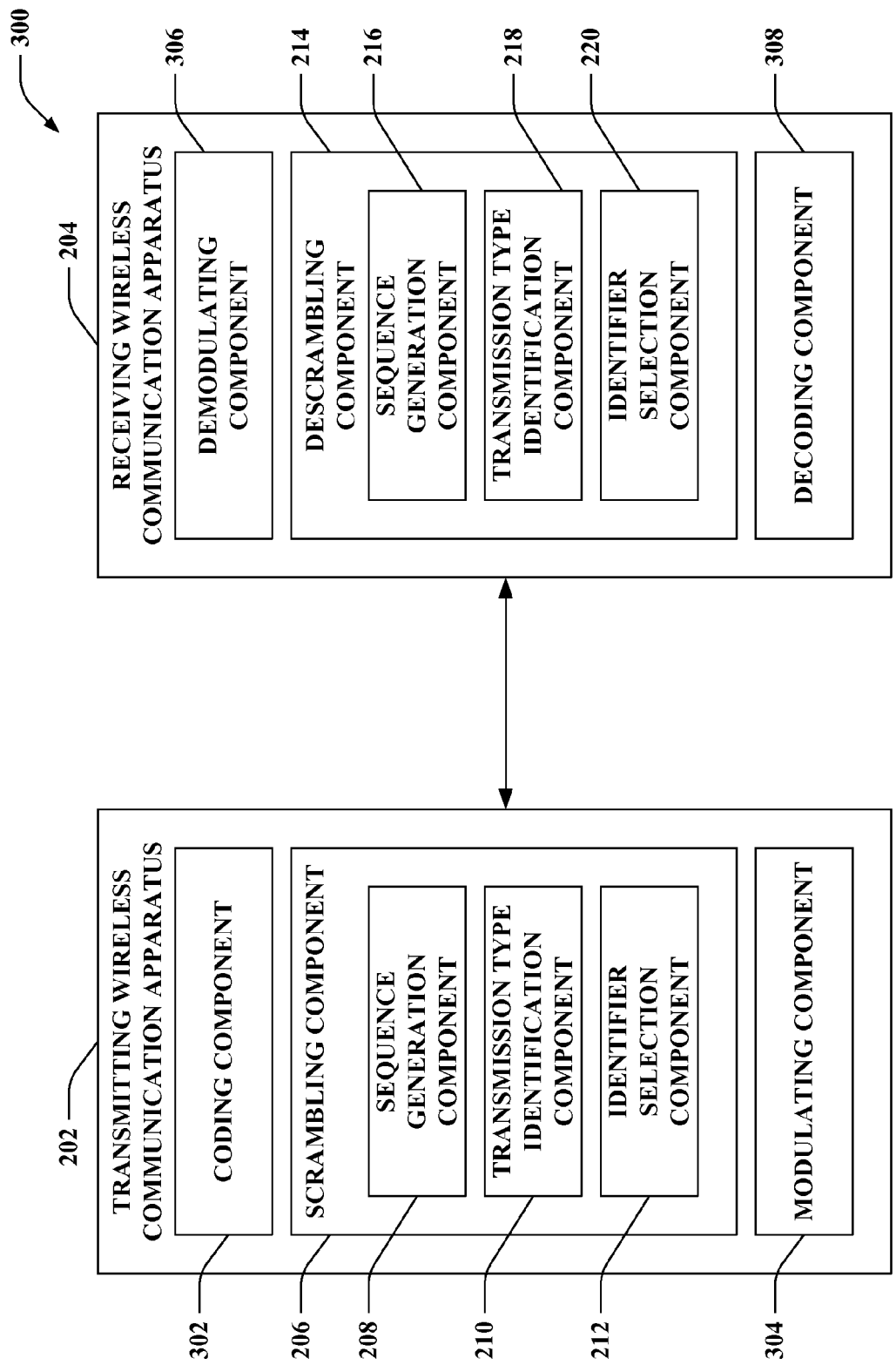
FIG. 3 is an illustration of an example system that scrambles and unscrambles data channel transmissions in wireless communication environment.

Now turning to FIG. 3, illustrated is a system 300 that scrambles and unscrambles data channel transmissions in wireless communication environment. System 300 includes transmitting wireless communication apparatus 202 (e.g., a base station, an access terminal, . . . ) and receiving wireless communication apparatus 204 (e.g., an access terminal, a base station, . . . ). Transmitting wireless communication apparatus 202 can include scrambling component 206, which can further include sequence generation component 208, transmission type identification component 210, and identifier selection component 212 as described herein. Moreover, receiving wireless communication apparatus 204 can include descrambling component 214, which can further include sequence generation component 216, transmission type identification component 218, and identifier selection component 220 as set forth herein.

Transmitting wireless communication apparatus 202 can further include a coding component 302 and a modulating component 304. Coding component 302 can encode data for transmission. According to an example, coding component 302 can apply Turbo coding to data for transmission to generate encoded data; however, the claimed subject matter is not so limited.

The encoded data yielded by coding component 302 can thereafter be scrambled by scrambling component 206 utilizing a scrambling sequence generated by sequence generation component 208 as described herein. For instance, the generated scrambling sequence can be initialized as a function of a type of RNTI (e.g., recognized by identifier selection component 212, . . . ) from a set of RNTI types (e.g., the set of RNTI types can include SI-RNTI, P-RNTI, RA-RNTI, Temporary C-RNTI, SPS C-RNTI, and C-RNTI for a PDSCH transmission, the set of RNTI types can include Temporary C-RNTI, SPS C-RNTI, and C-RNTI for a PUSCH transmission, . . . ) corresponding to a type of transmission to which the encoded data pertains (e.g., detected by transmission type identification component 210, . . . ). Scrambling component 206 can employ bit-level scrambling of the encoded data; thus, a block of encoded bits can be scrambled by scrambling component 206 to yield a block of scrambled bits.

Modulating component 304 can transform the block of scrambled bits yielded by scrambling component 206 to a corresponding block of complex modulation symbols. The transformation, for instance, effectuated by modulating component 304 can be dependent on a type of modulation scheme employed thereby.

Further, although not shown, for PUSCH transmissions, transmitting wireless communication apparatus 202 (e.g., access terminal, . . . ) can include a precoding component that can precode the complex modulation symbols yielded by modulating component 304, a resource element mapping component that can map the complex modulation symbols to resource elements, and/or a signal generation component that can yield a complex-valued time-domain Single Carrier-Frequency Division Multiple Access (SC-FDMA) signal for each antenna port. Moreover, although not depicted, for PDSCH transmissions, transmitting wireless communication apparatus 202 (e.g., base station, . . . ) can include a layer mapping component that maps the complex modulation symbols generated by modulating component 304 onto one or more transmission layers, a precoding component that can precode the complex modulation symbols on each layer for transmission on antenna ports, a resource element mapping component that can map complex modulation symbols for each antenna port to resource elements, and/or a signal generation component that can yield complex time domain Orthogonal Frequency Division Multiplexing (OFDM) signals for each antenna port. It is to be appreciated, however, that the claimed subject matter is not limited to the foregoing examples.

Moreover, receiving wireless communication apparatus 204 can further include a demodulating component 306 and a decoding component 308. Demodulating component 306 can demodulate complex modulation symbols received from transmitting wireless communication apparatus 202 to output a demodulated block of scrambled bits. Further, the demodulated block of scrambled bits yielded by demodulating component 306 can be unscrambled by descrambling component 214. For instance, descrambling component 214 can leverage a descrambling sequence, which can correspond to a scrambling sequence utilized by transmitting wireless communication apparatus 202, to unscramble the demodulated block of scrambled bits. Moreover, the descrambling sequence can be initialized by sequence generation component 216 utilizing a particular type of RNTI. Further, the particular type of RNTI can be selected from a set of possible types of RNTIs by identifier selection component 220 as a function of a transmission type associated with the received transmission recognized by transmission type identification component 218. Further, decoding component 308 can decode the unscrambled bits to recover the data sent by transmitting wireless communication apparatus 202.

Figure 4:
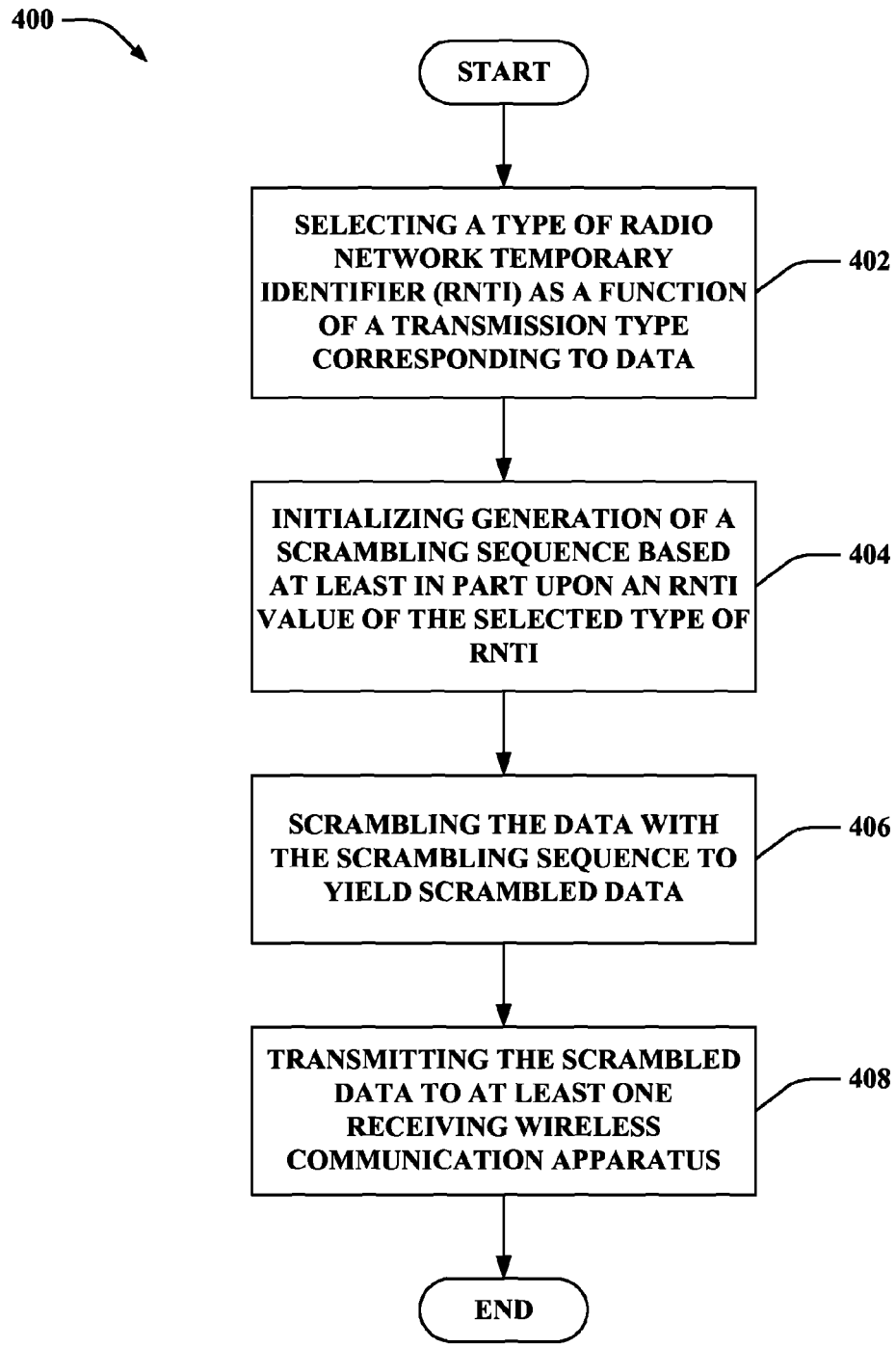
FIG. 4 is an illustration of an example methodology that facilitates scrambling data for transmission in a wireless communication environment.
Figure 5:
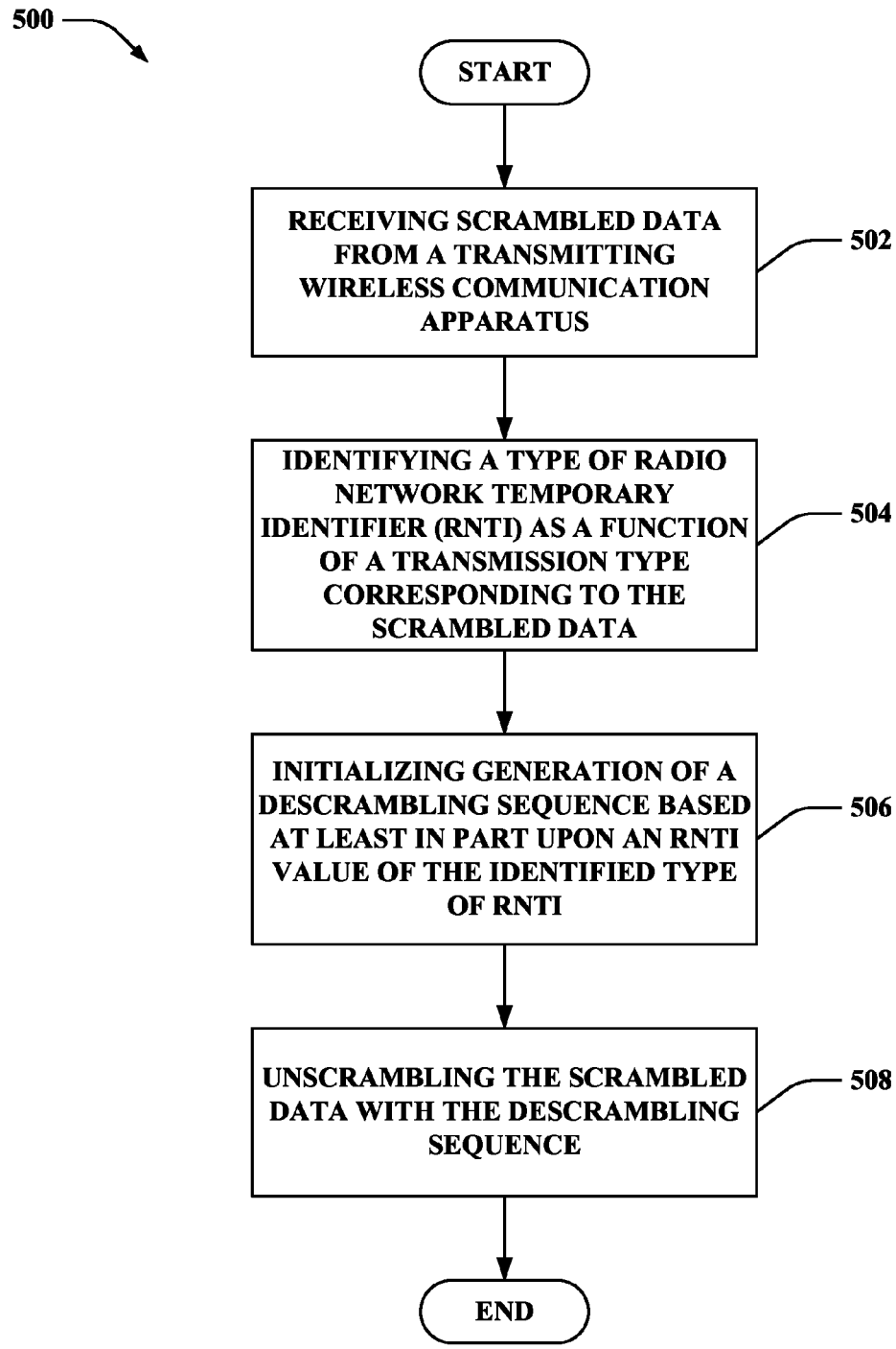
FIG. 5 is an illustration of an example methodology that facilitates descrambling data in a wireless communication environment.

Referring to FIGS. 4-5, methodologies relating to initializing scrambling sequence generation based upon a given type of Radio Network Temporary Identifier (RNTI) in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates scrambling data for transmission in a wireless communication environment. At 402, a type of Radio Network Temporary Identifier (RNTI) can be selected as a function of a transmission type corresponding to data. For instance, for a downlink data channel transmission (e.g., via a Physical Downlink Shared Channel (PDSCH), . . . ), the type of RNTI can be selected from a set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI). Pursuant to another illustration, for an uplink data channel transmission (e.g., via a Physical Uplink Shared Channel (PUSCH), . . . ), the type of RNTI can be selected from a set of RNTI types that includes Temporary Cell RNTI (Temporary C-RNTI), Semi-Persistent Scheduling Cell RNTI (SPS C-RNTI), and Cell RNTI (C-RNTI).

Further, the transmission type corresponding to the data can be recognized. For example, the data can be recognized to be associated with a system information transmission, a paging message, a random access response message (message 2 of a random access procedure), a scheduled transmission (message 3 of a random access procedure), a contention resolution message (message 4 of a random access procedure), a semi-persistent scheduling (SPS) transmission, or a regular unicast transmission (e.g., non-SPS transmission, . . . ). When the data is associated with a system information transmission, SI-RNTI can be chosen as the type of RNTI. When the data is associated with a paging message, then P-RNTI can be selected as the type of RNTI. Further, when the data is associated with a random access response message, then RA-RNTI can be chosen as the type of RNTI. Moreover, when the data corresponds to a scheduled transmission or a contention resolution message as part of a random access procedure, then Temporary C-RNTI can be selected as the type of RNTI. According to another illustration, when the data pertains to an SPS transmission, then SPS C-RNTI can be chosen as the type of RNTI. By way of further illustration, when the data is associated with a regular unicast transmission (e.g., non-SPS traffic, ... ), then C-RNTI can be selected as the type of the RNTI.

In accordance with another example, the transmission type can be recognized at least in part based upon a logical channel with which the data corresponds. Thus, the data can be detected to be associated with a Broadcast Control Channel (BCCH), a Paging Control Channel (PCCH), a random access response sent over a Downlink Shared Channel (DL-SCH), a Common Control Channel (CCCH), or a Dedicated Traffic Channel (DTCH). Further, BCCH can carry system information, PCCH can carry a paging message, a random access response can be sent over DL-SCH, CCCH can carry a scheduled transmission or a contention resolution message from a random access procedure, and DTCH can carry uncast traffic (e.g., associated with a scheduled transmission or a contention resolution message from a random access procedure, an SPS transmission, regular traffic, ... ). Additionally or alternatively, the transmission type can be recognized as being unicast, multicast, or broadcast.

Pursuant to another example, a transmission type of a control transmission associated with the transmission type corresponding to the data can be recognized. For instance, the control transmission can be explicit (e.g., with a Physical Downlink Control Channel (PDCCH), ... ) or implicit (e.g., semi-persistent scheduling without PDCCH, ... ). Further, the transmission type of the control transmission can be linked with the transmission type corresponding to the data. Thus, the type of RNTI can be selected as a function of the transmission type of the control transmission.

At 404, generation of a scrambling sequence can be initialized based at least in part upon an RNTI value of the selected type of RNTI. The RNTI value can correspond to one or more intended recipients for the data. Further, the generation of the scrambling sequence can be initialized at a start of each subframe. Moreover, the generation of the scrambling sequence can additionally or alternatively be initialized based upon an identity of a cell and/or a slot number (or subframe number) within a radio frame.

At 406, the data can be scrambled with the scrambling sequence to yield scrambled data. For example, bit level scrambling can be effectuated. Following this example, the data can include a block of bits, which can be multiplied using an exclusive-or operation, by the scrambling sequence to yield a block of scrambled bits. At 408, the scrambled data can be transmitted to at least one receiving wireless communication apparatus. The at least one receiving wireless communication apparatus can be at least one access terminal, at least one base station, or the like.

Now turning to FIG. 5, illustrated is a methodology 500 that facilitates descrambling data in a wireless communication environment. At 502, scrambled data can be received from a transmitting wireless communication apparatus. The transmitting wireless communication apparatus can be an access terminal, a base station, and so forth. At 504, a type of Radio Network Temporary Identifier (RNTI) can be identified as a function of a transmission type corresponding to the scrambled data. For instance, for a downlink data channel transmission (e.g., via a Physical Downlink Shared Channel (PDSCH), ... ), the type of RNTI can be identified from a set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI). Pursuant to another illustration, for an uplink data channel transmission (e.g., via a Physical Uplink Shared Channel (PUSCH), ... ), the type of RNTI can be identified from a set of RNTI types that includes Temporary Cell RNTI (Temporary C-RNTI), Semi-Persistent Scheduling Cell RNTI (SPS C-RNTI), and Cell RNTI (C-RNTI).

The transmission type corresponding to the scrambled data can be recognized. For example, the scrambled data can be identified to correspond to a system information transmission, a paging message, a random access response message (message 2 of a random access procedure), a scheduled transmission (message 3 of a random access procedure), a contention resolution message (message 4 of a random access procedure), a semi-persistent scheduling (SPS) transmission, or a regular unicast transmission (e.g., non-SPS transmission, ... ). When the scrambled data is associated with a system information transmission, SI-RNTI can be identified as the type of RNTI. When the scrambled data is associated with a paging message, then P-RNTI can be identified as the type of RNTI. Further, when the scrambled data is associated with a random access response message, then RA-RNTI can be identified as the type of RNTI. Moreover, when the scrambled data corresponds to a scheduled transmission or a contention resolution message as part of a random access procedure, then Temporary C-RNTI can be identified as the type of RNTI. According to another illustration, when the scrambled data pertains to an SPS transmission, then SPS C-RNTI can be identified as the type of RNTI. By way of further illustration, when the scrambled data is associated with a regular unicast transmission (e.g., non-SPS traffic, ... ), then C-RNTI can be identified as the type of the RNTI According to another example, the transmission type can be recognized at least in part based upon a logical channel with which the scrambled data corresponds. Thus, the scrambled data can be detected to be associated with a Broadcast Control Channel (BCCH), a Paging Control Channel (PCCH), a random access response sent over a Downlink Shared Channel (DL-SCH), a Common Control Channel (CCCH), or a Dedicated Traffic Channel (DTCH). Further, BCCH can carry system information, PCCH can carry a paging message, a random access response can be sent over DL-SCH, CCCH can carry a scheduled transmission or a contention resolution message from a random access procedure, and DTCH can carry uncast traffic (e.g., associated with a scheduled transmission or a contention resolution message from a random access procedure, an SPS transmission, regular traffic, ... ). Additionally or alternatively, the transmission type can be recognized as being unicast, multicast, or broadcast.

Pursuant to another example, a transmission type of a control transmission associated with the scrambled data can be recognized. For instance, the control transmission can be explicit (e.g., with a Physical Downlink Control Channel (PDCCH), ... ) or implicit (e.g., semi-persistent scheduling without PDCCH, ... ). Further, the transmission type of the control transmission can be linked with a transmission type corresponding to the scrambled data. Thus, the type of RNTI can be identified as a function of the transmission type of the control transmission.

At 506, generation of a descrambling sequence can be initialized based at least in part upon an RNTI value of the identified type of RNTI. The descrambling sequence can correspond to a scrambling sequence applied by the transmitting wireless communication apparatus to yield the scrambled data. Further, the generation of the descrambling sequence can be initialized at a start of each subframe. Moreover, the generation of the descrambling sequence can additionally or alternatively be initialized based upon an identity of a cell and/or a slot number (or subframe number) within a radio frame. At 508, the scrambled data can be unscrambled with the descrambling sequence.

It will be appreciated that, in accordance with one or more aspects described herein, inferences can be made regarding initializing scrambling sequence generation based upon an RNTI type which is dependent upon a type of transmission in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
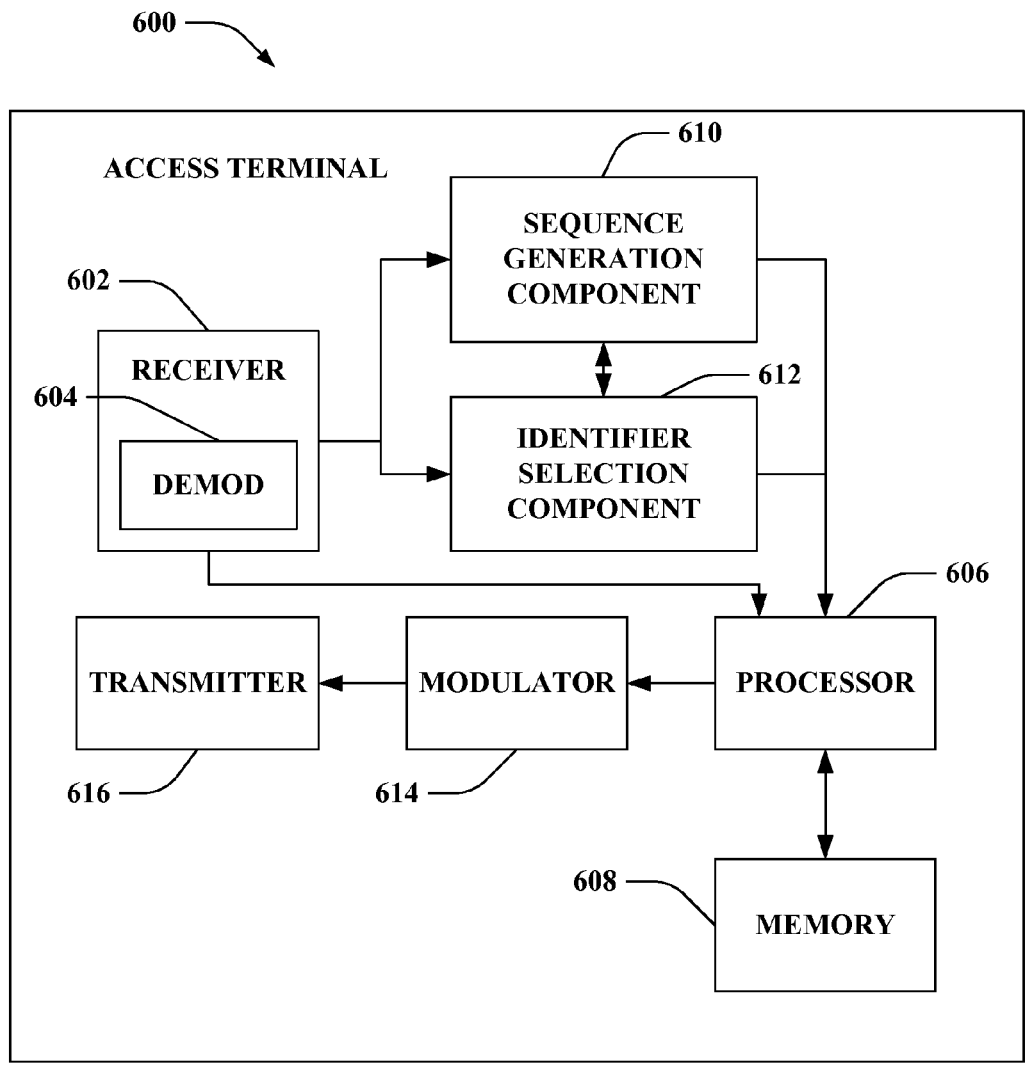
FIG. 6 is an illustration of an example access terminal that initializes scrambling sequence generation and/or descrambling sequence generation based upon an RNTI type in a wireless communication system.

FIG. 6 is an illustration of an access terminal 600 that initializes scrambling sequence generation and/or descrambling sequence generation based upon an RNTI type in a wireless communication system. Access terminal 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 (e.g., which can be substantially similar to demodulating component 306 of FIG. 3, . . . ) that can demodulate received symbols and provide them to a processor 606 for channel estimation. Processor 606 can be a processor dedicated to analyzing information received by receiver 602 and/or generating information for transmission by a transmitter 616, a processor that controls one or more components of access terminal 600, and/or a processor that both analyzes information received by receiver 602, generates information for transmission by transmitter 616, and controls one or more components of access terminal 600.

Access terminal 600 can additionally comprise memory 608 that is operatively coupled to processor 606 and that can store data to be transmitted, received data, and any other suitable information related to performing the various actions and functions set forth herein. Memory 608, for instance, can store protocols and/or algorithms associated with initializing scrambling sequence generation and/or descrambling sequence generation as a function of an RNTI type which corresponds to a type/nature of a transmission.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can be operatively coupled to a sequence generation component 610 and/or an identifier selection component 612. Sequence generation component 610 can be substantially similar to sequence generation component 208 of FIG. 2 and/or sequence generation component 216 of FIG. 2. Further, identifier selection component 612 can be substantially similar to identifier selection component 212 of FIG. 2 and/or identifier selection component 220 of FIG. 2. Although not shown, it is to be appreciated that sequence generation component 610 and/or identifier selection component 612 can be leveraged by a scrambling component (e.g., to scramble data for transmission, . . . ) and/or a descrambling component (e.g., to unscramble received data, . . . ). Identifier selection component 612 can recognize a type of RNTI corresponding to a transmission type as described herein. Further, sequence generation component 610 can be initialized as a function of the type of RNTI corresponding to the transmission type. Moreover, although not shown, it is contemplated that access terminal 600 can further include a transmission type identification component, which can be substantially similar to transmission type identification component 210 of FIG. 2 and/or transmission type identification component 218 of FIG. 2. Access terminal 600 still further comprises a modulator 614 (e.g., which can be substantially similar to modulating component 304 of FIG. 3, . . . ) and a transmitter 616 that transmits data, signals, etc. to a base station. Although depicted as being separate from the processor 606, it is to be appreciated that sequence generation component 610, identifier selection component 612 and/or modulator 614 can be part of processor 606 or a number of processors (not shown).

Figure 7:
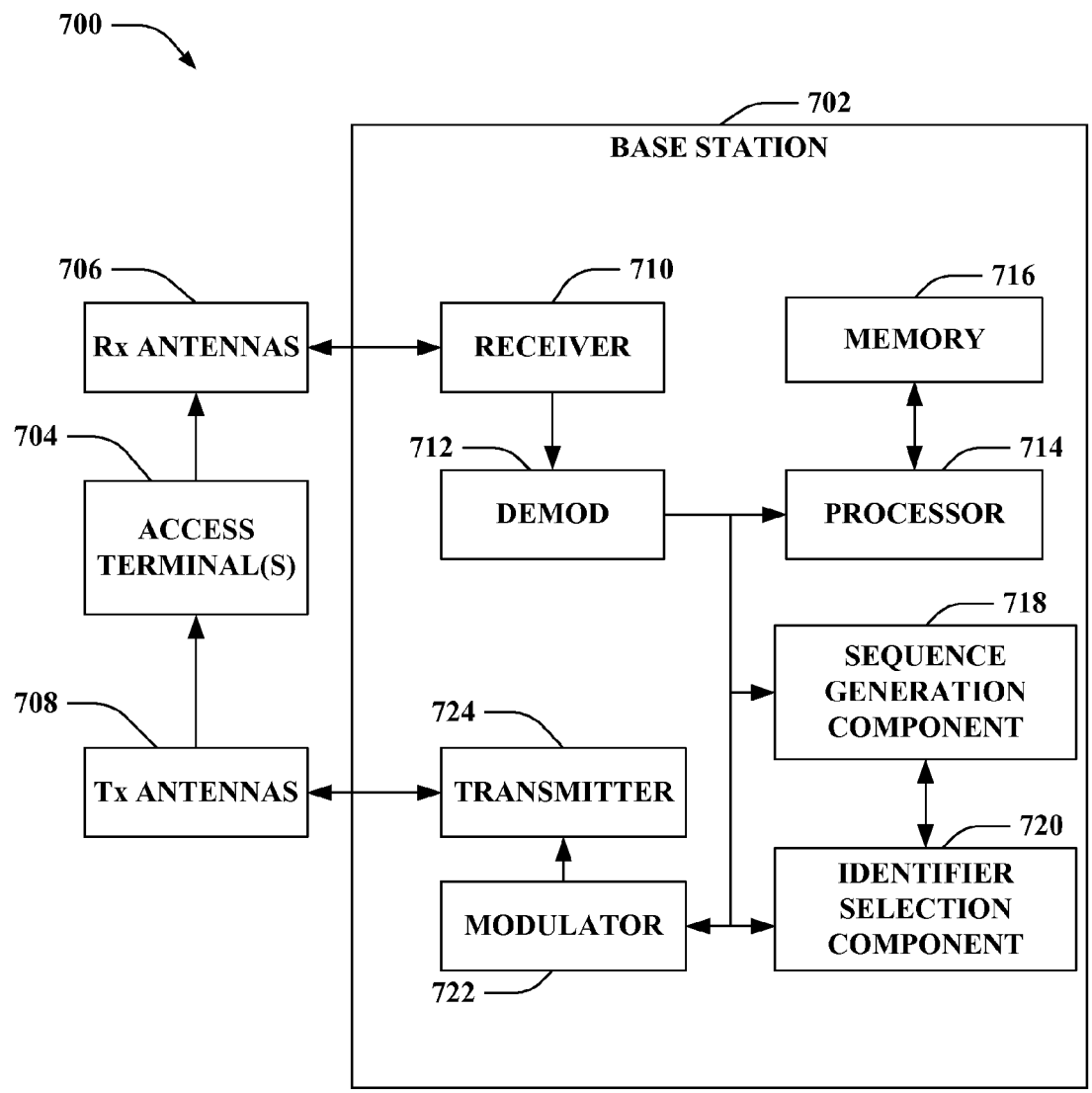
FIG. 7 is an illustration of an example system that employs RNTI-dependent scrambling sequence initialization and/or descrambling sequence initialization in a wireless communication environment.

FIG. 7 is an illustration of a system 700 that employs RNTI-dependent scrambling sequence initialization and/or descrambling sequence initialization in a wireless communication environment. System 700 comprises a base station 702 (e.g., access point, . . . ) with a receiver 710 that receives signal(s) from one or more access terminals 704 through a plurality of receive antennas 706, and a transmitter 724 that transmits to the one or more access terminals 704 through a transmit antenna 708. Receiver 710 can receive information from receive antennas 706 and is operatively associated with a demodulator 712 (e.g., substantially similar to demodulating component 306 of FIG. 3, . . . ) that demodulates received information. Demodulated symbols are analyzed by a processor 714 that can be similar to the processor described above with regard to FIG. 6, and which is coupled to a memory 716 that stores data to be transmitted to or received from access terminal(s) 704 and/or any other suitable information related to performing the various actions and functions set forth herein. Processor 714 is further coupled to a sequence generation component 718 and/or an identifier selection component 720. Sequence generation component 718 can be substantially similar to sequence generation component 208 of FIG. 2 and/or sequence generation component 216 of FIG. 2. Further, identifier selection component 720 can be substantially similar to identifier selection component 212 of FIG. 2 and/or identifier selection component 220 of FIG. 2. Although not shown, it is to be appreciated that sequence generation component 718 and/or identifier selection component 720 can be leveraged by a scrambling component (e.g., to scramble data for transmission, . . . ) and/or a descrambling component (e.g., to unscramble received data, . . . ). Identifier selection component 720 can recognize a type of RNTI corresponding to a type of transmission as set forth herein. Further, sequence generation component 718 can be initialized as a function of the type of RNTI corresponding to the type of transmission. Moreover, although not shown, it is contemplated that base station 702 can further include a transmission type identification component, which can be substantially similar to transmission type identification component 210 of FIG. 2 and/or transmission type identification component 218 of FIG. 2. Base station 702 can further include a modulator 722 (e.g., which can be substantially similar to modulating component 304 of FIG. 3, . . . ). Modulator 722 can multiplex a frame for transmission by a transmitter 724 through antennas 708 to access terminal(s) 704 in accordance with the aforementioned description. Although depicted as being separate from the processor 714, it is to be appreciated that sequence generation component 718, identifier selection component 720, and/or modulator 722 can be part of processor 714 or a number of processors (not shown).

Figure 8:
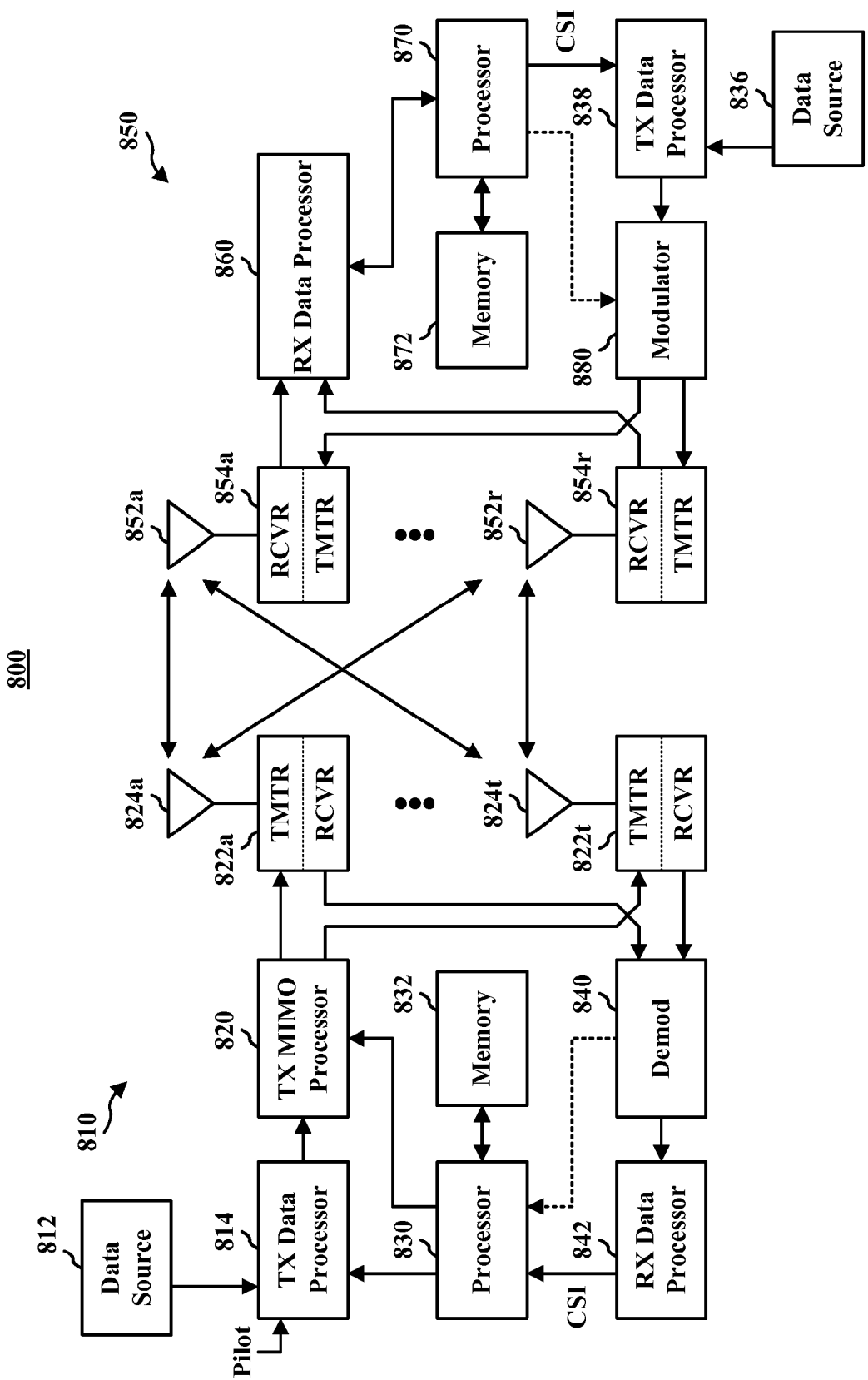
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which precoding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
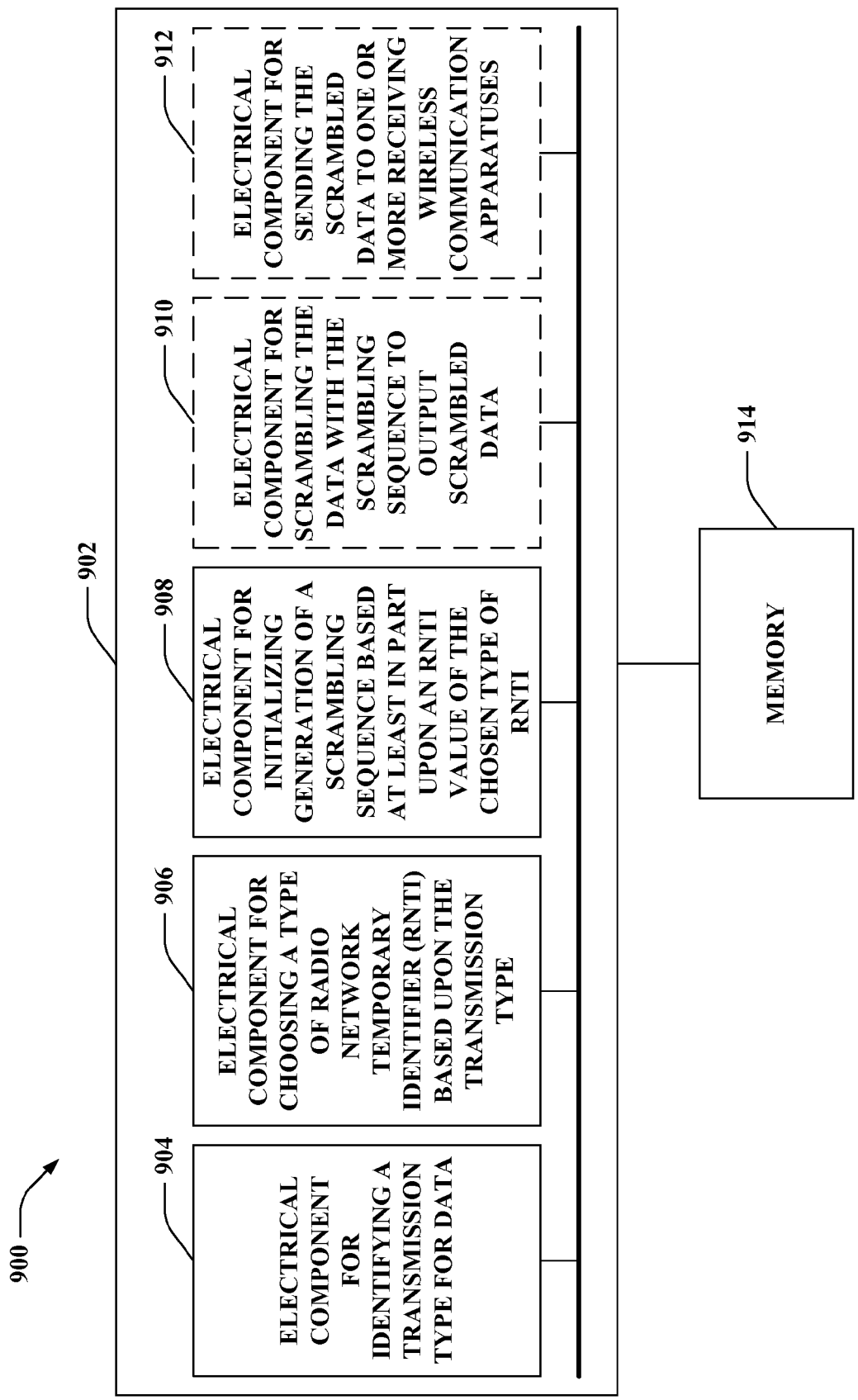
FIG. 9 is an illustration of an example system that enables employing RNTI-dependent scrambling sequence initialization in a wireless communication environment.

With reference to FIG. 9, illustrated is a system 900 that enables employing RNTI-dependent scrambling sequence initialization in a wireless communication environment. For example, system 900 can reside at least partially within a base station. According to another example, system 900 can reside in an access terminal. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for identifying a transmission type for data 904. Further, logical grouping 902 can include an electrical component for choosing a type of Radio Network Temporary Identifier (RNTI) based upon the transmission type 906. Moreover, logical grouping 902 can include an electrical component for initializing generation of a scrambling sequence based at least in part upon an RNTI value of the chosen type of RNTI 908. For instance, the RNTI value can correspond to one or more intended recipients of the data. Logical grouping 902 can also optionally include an electrical component for scrambling the data with the scrambling sequence to output scrambled data 910. Additionally, logical grouping 902 can optionally include an electrical component for sending the scrambled data to one or more receiving wireless communication apparatuses 912. Additionally, system 900 can include a memory 914 that retains instructions for executing functions associated with electrical components 904, 906, 908, 910 and 912. While shown as being external to memory 914, it is to be understood that one or more of electrical components 904, 906, 908, 910, and 912 can exist within memory 914.

Figure 10:
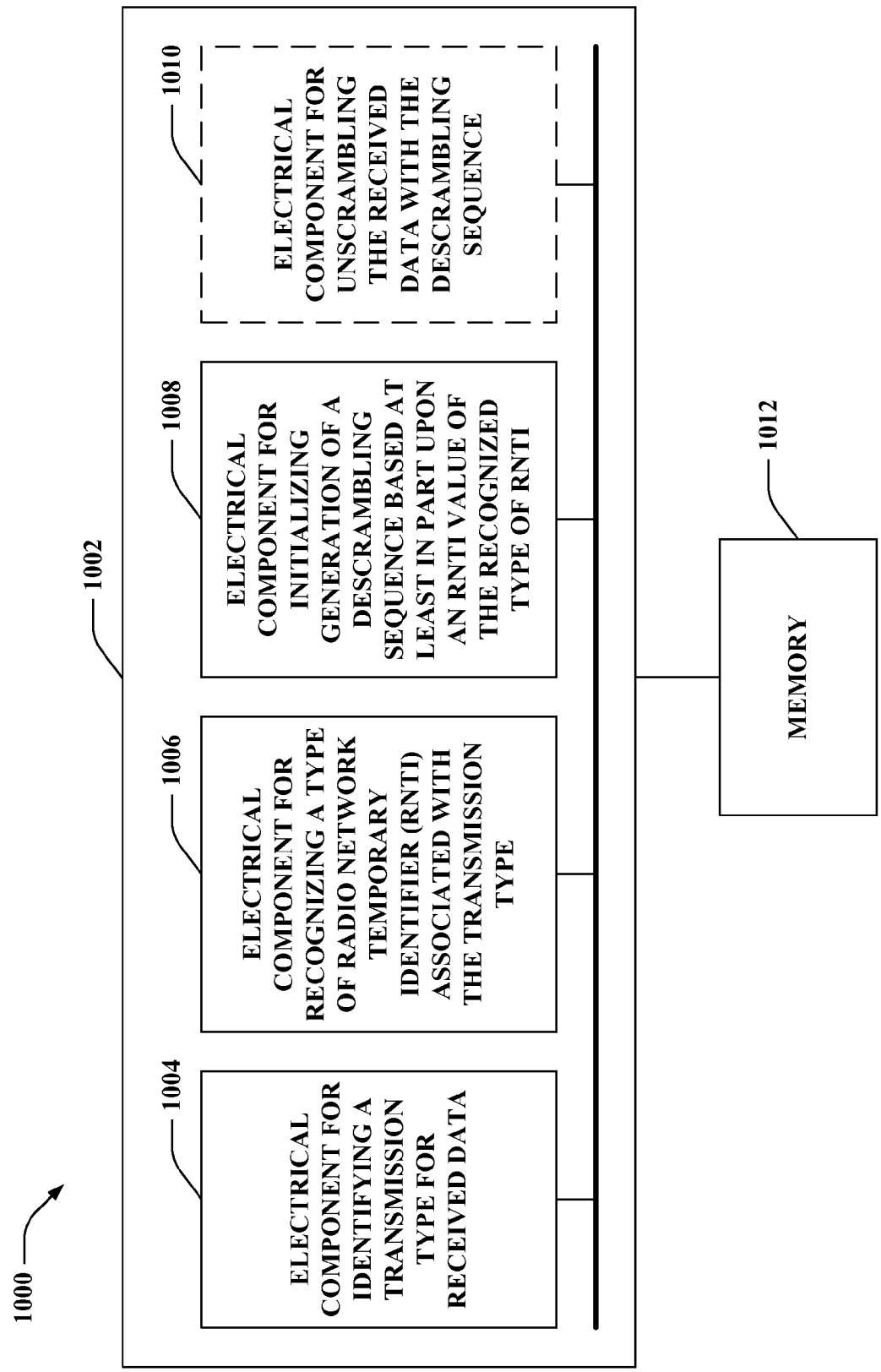
FIG. 10 is an illustration of an example system that enables effectuating RNTI-dependent descrambling sequence initialization in a wireless communication environment.

With reference to FIG. 10, illustrated is a system 1000 that enables effectuating RNTI-dependent descrambling sequence initialization in a wireless communication environment. For example, system 1000 can reside within an access terminal. Pursuant to another example, system 1000 can reside can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for identifying a transmission type for received data 1004. Further, logical grouping 1002 can include an electrical component for recognizing a type of Radio Network Temporary Identifier (RNTI) associated with the transmission type 1006. Moreover, logical grouping 1002 can include an electrical component for initializing generation of a descrambling sequence based at least in part upon an RNTI value of the recognized type of RNTI 1008. Logical grouping 1002 can also optionally include an electrical component for unscrambling the received data with the descrambling sequence 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates scrambling data for transmission in a wireless communication environment, comprising:
   initializing a scrambling sequence based at least in part upon a Radio Network Temporary Identifier (RNTI) that is a function of a transmission type corresponding to data to be transmitted;
   scrambling the data with the scrambling sequence to yield scrambled data; and
   transmitting the scrambled data to at least one receiving wireless communication apparatus;
   wherein at least one of:
     a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
     a type of the RNTI, for an uplink data channel transmission, is from a second set of RNTI types that includes at least the Temporary C-RNTI, the SPS C-RNTI, and the C-RNTI.

2. The method of claim 1, further comprising recognizing the transmission type corresponding to the data.

3. The method of claim 1, wherein initializing the scrambling sequence comprises initializing based at least in part upon the SI-RNTI type of the RNTI when the data corresponds to a system information transmission.

4. The method of claim 1, wherein initializing the scrambling sequence comprises initializing based at least in part upon the P-RNTI type of the RNTI when the data pertains to a paging message.

5. The method of claim 1, wherein initializing the scrambling sequence comprises initializing based at least in part upon the RA-RNTI type of the RNTI when the data relates to a random access response message.

6. The method of claim 1, wherein initializing the scrambling sequence comprises initializing based at least in part upon the Temporary C-RNTI type of the RNTI when the data corresponds to at least one of a scheduled transmission of a random access procedure or a contention resolution message of a random access procedure.

7. The method of claim 1, wherein initializing the scrambling sequence comprises initializing based at least in part upon the SPS C-RNTI type of the RNTI when the data relates to an SPS transmission.

8. The method of claim 1, wherein initializing the scrambling sequence comprises initializing based at least in part upon the C-RNTI type of the RNTI when the data pertains to non-SPS unicast traffic.

9. The method of claim 1, further comprising:
   recognizing a transmission type of a control transmission associated with the transmission type corresponding to the data, wherein the control transmission is one of explicit or implicit; and
   wherein initializing the scrambling sequence comprises initializing based at least in part upon the type of the RNTI as a function of the transmission type of the control transmission.

10. The method of claim 1, further comprising identifying an RNTI value of the RNTI based upon one or more intended recipients for the data.

11. The method of claim 1, wherein initializing the scrambling sequence comprises initializing the scrambling sequence at a start of each subframe.

12. The method of claim 1, wherein initializing the scrambling sequence comprises initializing the scrambling sequence based upon at least one of an identity of a cell or a slot number within a radio frame.

13. The method of claim 1, further comprising selecting the type of the RNTI as the function of the transmission type corresponding to the data.

14. The method of claim 1, further comprising:
   implicitly recognizing the transmission type; and
   wherein initializing the scrambling sequence comprises initializing based at least in part upon the SPS C-RNTI type of the RNTI based on implicitly recognizing the transmission type.

15. A wireless communications apparatus, comprising
   a memory that retains instructions related to initializing a scrambling sequence based at least in part upon a Radio Network Temporary Identifier (RNTI) that is a function of a transmission type corresponding to data to be transmitted, and scrambling the data with the scrambling sequence to yield scrambled data; and
   a processor, coupled to the memory, configured to execute the instructions retained in the memory;
   wherein at least one of:
     a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
     a type of the RNTI, for an uplink data channel transmission, is from a second set of RNTI types that includes at least the Temporary C-RNTI, the SPS C-RNTI, and the C-RNTI.

16. The wireless communications apparatus of claim 15, wherein the memory further retains instructions related to sending the scrambled data to at least one receiving wireless communication apparatus.

17. The wireless communications apparatus of claim 15, wherein the memory further retains instructions related to initializing of the scrambling sequence comprising initializing based at least in part upon the SI-RNTI type of the RNTI when the data corresponds to a system information transmission.

18. The wireless communications apparatus of claim 15, wherein the memory further retains instructions related to initializing of the scrambling sequence comprising initializing based at least in part upon the P-RNTI type of the RNTI when the data pertains to a paging message.

19. The wireless communications apparatus of claim 15, wherein the memory further retains instructions related to initializing of the scrambling sequence comprising initializing based at least in part upon the RA-RNTI type of the RNTI when the data relates to a random access response message.

20. The wireless communications apparatus of claim 15, wherein the memory further retains instructions related to initializing of the scrambling sequence comprising initializing based at least in part upon the Temporary C-RNTI type of the RNTI when the data corresponds to at least one of a scheduled transmission of a random access procedure or a contention resolution message of a random access procedure.

21. The wireless communications apparatus of claim 15, wherein the memory further retains instructions related to initializing of the scrambling sequence comprising initializing based at least in part upon the SPS C-RNTI type of the RNTI when the data relates to an SPS transmission.

22. The wireless communications apparatus of claim 15, wherein the memory further retains instructions related to initializing of the scrambling sequence comprising initializing based at least in part upon the C-RNTI type of the RNTI when the data pertains to non-SPS unicast traffic.

23. The wireless communications apparatus of claim 15, wherein the memory further retains instructions related to identifying a type of control transmission related to the transmission type corresponding to the data, and wherein initializing the scrambling sequence comprises initializing based at least in part upon the type of the RNTI as a function of the transmission type of the control transmission.

24. The apparatus of claim 15, wherein the processor is further configured to:
   implicitly recognize the transmission type; and
   initialize the scrambling sequence based at least in part upon the SPS C-RNTI type of the RNTI based on implicitly recognizing the transmission type.

25. A wireless communications apparatus, comprising:
   means for initializing a scrambling sequence based at least in part upon a Radio Network Temporary Identifier (RNTI) that is a function of a transmission type corresponding to data to be transmitted;
   means for scrambling the data with the scrambling sequence to output scrambled data; and
   means for sending the scrambled data to one or more receiving wireless communication apparatuses;
   wherein at least one of:
      a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
      a type of the RNTI, for an uplink data channel transmission, is from a second set of RNTI types that includes at least the Temporary C-RNTI, the SPS C-RNTI, and the C-RNTI.

26. The apparatus of claim 25, wherein the means for initializing the scrambling sequence is configured to initialize based at least in part upon the SPS C-RNTI type of the RNTI when the data relates to an SPS transmission.

27. A non-transitory computer-readable medium comprising a computer program product, comprising:
   code for initializing a scrambling sequence based at least in part upon a Radio Network Temporary Identifier (RNTI) that is a function of a transmission type corresponding to data to be transmitted; and
   code for scrambling the data with the scrambling sequence to output scrambled data;
   wherein at least one of:
      a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
      a type of the RNTI, for an uplink data channel transmission, is from a second set of RNTI types that includes at least the Temporary C-RNTI, the SPS C-RNTI, and the C-RNTI.

28. The non-transitory computer-readable medium of claim 27, wherein the computer-readable medium further comprises code for transmitting the scrambled data to one or more receiving wireless communication apparatuses.

29. The non-transitory computer-readable medium of claim 27, wherein the code for initializing the scrambling sequence is further configured to initialize based at least in part upon the SPS C-RNTI type of the RNTI when the data relates to an SPS transmission.

30. A wireless communications apparatus, comprising:
   a processor configured to:
      initialize a scrambling sequence based at least in part upon a Radio Network Temporary Identifier (RNTI) that is a function of a transmission type corresponding to data to be transmitted;
      scramble the data with the scrambling sequence to output scrambled data; and
   transmit the scrambled data to one or more receiving wireless communication apparatuses;
   wherein at least one of:
      a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
      a type of the RNTI, for an uplink data channel transmission, is from a second set of RNTI types that includes at least the Temporary C-RNTI, the SPS C-RNTI, and the C-RNTI.

31. The apparatus of claim 30, wherein the processor is further configured to initialize based at least in part upon the SPS C-RNTI type of the RNTI when the data relates to an SPS transmission.

32. A method that facilitates descrambling data in a wireless communication environment, comprising:
   receiving a transmission including scrambled data from a transmitting wireless communication apparatus, wherein the scrambled data results from a scrambling sequence based at least in part upon a Radio Network Temporary Identifier (RNTI) that is a function of a transmission type corresponding to the data of the transmission;
   initializing a descrambling sequence based at least in part upon the RNTI that is a function of the transmission type corresponding to the data of the transmission; and
   unscrambling the scrambled data with the descrambling sequence;
   wherein at least one of:
      a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
      a type of the RNTI, for an uplink data channel transmission, is from a second set of RNTI types that includes at least the Temporary C-RNTI, the SPS C-RNTI, and the C-RNTI.

33. The method of claim 32, wherein initializing the descrambling sequence comprises initializing based at least in part upon the SI-RNTI type of the RNTI when the data corresponds to a system information transmission.

34. The method of claim 32, wherein initializing the descrambling sequence comprises initializing based at least in part upon the P-RNTI type of the RNTI when the data pertains to a paging message.

35. The method of claim 32, wherein initializing the descrambling sequence comprises initializing based at least in part upon the RA-RNTI type of the RNTI when the data relates to a random access response message.

36. The method of claim 32, wherein initializing the descrambling sequence comprises initializing based at least in part upon the Temporary C-RNTI type of the RNTI when the data corresponds to at least one of a scheduled transmission of a random access procedure or a contention resolution message of a random access procedure.

37. The method of claim 32, wherein initializing the descrambling sequence comprises initializing based at least in part upon the SPS C-RNTI type of the RNTI when the data relates to an SPS transmission.

38. The method of claim 32, wherein initializing the descrambling sequence comprises initializing based at least in part upon the C-RNTI type of the RNTI when the data pertains to non-SPS unicast traffic.

39. The method of claim 32, further comprising:
recognizing the transmission type of a control transmission associated with the scrambled data; and
wherein initializing the descrambling sequence comprises initializing based at least in part upon the type of the RNTI as a function of the transmission type of the control transmission.

40. The method of claim 32, further comprising identifying the type of the RNTI as the function of the transmission type corresponding to the scrambled data.

41. A wireless communications apparatus, comprising:
a memory that retains instructions related to receiving a transmission including scrambled data from a transmitting wireless communication apparatus, wherein the scrambled data results from a scrambling sequence based at least in part upon a Radio Network Temporary Identifier (RNTI) that is a function of a transmission type corresponding to the data of the transmission, initializing a descrambling sequence based at least in part upon the RNTI that is a function of the transmission type corresponding to the data of the transmission, and unscrambling the scrambled data with the descrambling sequence;
wherein at least one of:
a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
a type of the RNTI, for an uplink data channel transmission, is from a second set of RNTI types that includes at least the Temporary C-RNTI, the SPS C-RNTI, and the C-RNTI; and
a processor, coupled to the memory, configured to execute the instructions retained in the memory.

42. The apparatus of claim 41, wherein the instructions related to initializing the descrambling sequence are configured to initialize based at least in part upon the SPS C-RNTI type of the RNTI when the data relates to an SPS transmission.

43. A wireless communications apparatus, comprising:
means for receiving a transmission including scrambled data from a transmitting wireless communication apparatus, wherein the scrambled data results from a scrambling sequence based at least in part upon a Radio Network Temporary Identifier (RNTI) that is a function of a transmission type corresponding to the data of the transmission;
means for initializing a descrambling sequence based at least in part upon the RNTI that is a function of the transmission type corresponding to the data of the transmission; and
means for unscrambling the received data with the descrambling sequence;
wherein at least one of:
a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
a type of the RNTI, for an uplink data channel transmission, is from a second set of RNTI types that includes at least the Temporary C-RNTI, the SPS C-RNTI, and the C-RNTI.

44. The wireless communications apparatus of claim 43, wherein the descrambling sequence corresponds to the scrambling sequence applied by the transmitting wireless communication apparatus to scramble the received data.

45. The apparatus of claim 43, wherein the means for initializing the descrambling sequence is configured to initialize based at least in part upon the SPS C-RNTI type of the RNTI when the data relates to an SPS transmission.

46. A non-transitory computer-readable medium comprising a computer program product, comprising:
code for receiving a transmission including scrambled data from a transmitting wireless communication apparatus, wherein the scrambled data results from a scrambling sequence based at least in part upon a Radio Network Temporary Identifier (RNTI) that is a function of a transmission type corresponding to the data of the transmission;
code for initializing a descrambling sequence based at least in part upon the RNTI that is a function of the transmission type corresponding to the data of the transmission; and
code for unscrambling the received data with the descrambling sequence;
wherein at least one of:
a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
a type of the RNTI, for an uplink data channel transmission, is from a second set of RNTI types that includes at least the Temporary C-RNTI, the SPS C-RNTI, and the C-RNTI.

47. The non-transitory computer-readable medium of claim 46, wherein the code for initializing the descrambling sequence is configured to initialize based at least in part upon the SPS C-RNTI type of the RNTI when the data relates to an SPS transmission.

48. A wireless communications apparatus, comprising:
a processor configured to:
- receive a transmission including scrambled data from a transmitting wireless communication apparatus, wherein the scrambled data results from a scrambling sequence based at least in part upon a Radio Network Temporary Identifier (RNTI) that is a function of a transmission type corresponding to the data of the transmission;
- initialize a descrambling sequence based at least in part upon the RNTI that is a function of the transmission type corresponding to the data of the transmission; and
- unscramble the received data with the descrambling sequence;

wherein at least one of:
- a type of the RNTI, for a downlink data channel transmission, is from a first set of RNTI types that includes System Information RNTI (SI-RNTI), Paging RNTI (P-RNTI), Random Access RNTI (RA-RNTI), Temporary Cell RNTI (Temporary C-RNTI), Semi-Persistent Scheduling Cell RNTI (SPS C-RNTI), and Cell RNTI (C-RNTI); or
- a type of the RNTI, for an uplink data channel transmission, is from a second set of RNTI types that includes at least the Temporary C-RNTI, the SPS C-RNTI, and the C-RNTI.

49. The apparatus of claim 48 wherein the processor is configured to initialize based at least in part upon the SPS C-RNTI type of the RNTI when the data relates to an SPS transmission.

* * * * *